(12) United States Patent
Sanders, II

(10) Patent No.: US 8,505,846 B1
(45) Date of Patent: Aug. 13, 2013

(54) VERTICAL TAKEOFF AND LANDING AIRCRAFT

(76) Inventor: Stanley Gordon Sanders, II, Marco Island, FL (US)

( * ) Notice: Subject to any disclaimer, the term of this patent is extended or adjusted under 35 U.S.C. 154(b) by 138 days.

(21) Appl. No.: 13/103,530

(22) Filed: May 9, 2011

Related U.S. Application Data

(60) Provisional application No. 61/395,255, filed on May 11, 2010.

(51) Int. Cl.
*B64C 27/22* (2006.01)

(52) U.S. Cl.
USPC ............. 244/7 R; 244/7 A; 244/7 B; 244/7 C

(58) Field of Classification Search
USPC ................. 244/7 A, 7 B, 7 C, 7 R; D12/326, D12/327
See application file for complete search history.

(56) References Cited

U.S. PATENT DOCUMENTS

| | | | | |
|---|---|---|---|---|
| 1,655,113 A | * | 1/1928 | Tesla | 244/7 B |
| 1,655,114 A | * | 1/1928 | Tesla | 244/7 B |
| 2,300,268 A | * | 10/1942 | Stuart | 244/7 B |
| 2,308,802 A | * | 1/1943 | Barling | 244/7 B |
| 2,387,762 A | * | 10/1945 | Leonard | 244/7 B |
| 2,397,632 A | * | 4/1946 | Stuart | 244/7 B |
| 2,437,789 A | * | 3/1948 | Robins | 244/7 B |
| 2,444,781 A | * | 7/1948 | Leonard | 244/7 B |
| 2,479,125 A | * | 8/1949 | Leonard | 244/7 B |
| 2,712,420 A | * | 7/1955 | Amster et al. | 244/7 B |
| 2,743,886 A | * | 5/1956 | Driggs et al. | 244/7 B |
| D178,948 S | * | 10/1956 | Bayless et al. | D12/326 |
| 2,794,609 A | * | 6/1957 | Perry | 244/7 B |
| D204,432 S | * | 4/1966 | Prewitt | D12/326 |
| 3,589,646 A | * | 6/1971 | Mori | 244/7 B |
| 5,062,587 A | * | 11/1991 | Wernicke | 244/7 B |
| 5,114,096 A | * | 5/1992 | Wernicke | 244/7 B |
| 5,289,994 A | * | 3/1994 | Del Campo Aguilera | 244/7 B |
| 5,340,057 A | * | 8/1994 | Schmittle | 244/48 |
| 5,395,073 A | * | 3/1995 | Rutan et al. | 244/48 |
| 5,516,060 A | * | 5/1996 | McDonnell | 244/7 B |
| 5,765,777 A | * | 6/1998 | Schmittle | 244/7 C |
| 5,765,783 A | * | 6/1998 | Albion | 244/7 B |
| 5,769,359 A | * | 6/1998 | Rutan et al. | 244/7 B |
| 5,839,691 A | * | 11/1998 | Lariviere | 244/7 R |
| RE36,487 E | * | 1/2000 | Wainfan | 244/7 B |
| 6,398,157 B1 | * | 6/2002 | Ingram | 244/7 B |
| 6,863,241 B2 | * | 3/2005 | Sash | 244/7 R |
| 7,118,066 B2 | * | 10/2006 | Allen | 244/7 B |
| 7,997,526 B2 | * | 8/2011 | Greenley | 244/7 B |
| 2002/0074452 A1 | * | 6/2002 | Ingram | 244/7 B |
| 2006/0011777 A1 | * | 1/2006 | Arlton et al. | 244/7 B |

* cited by examiner

*Primary Examiner* — Tien Dinh
*Assistant Examiner* — Steven Hawk
(74) *Attorney, Agent, or Firm* — Eric Karich

(57) ABSTRACT

An aircraft has a fuselage, a lifting free wing, and a nose section. The fuselage has a front end, a rear end, and a longitudinal axis. The lifting free wing is pivotally connected to the fuselage with a pivot. The nose section is pivotally mounted on the front end of the fuselage, and includes a pair of engines, and a pair of counter-rotating propellers. A canard free wing is pivotally connected to the nose section with a pivot. A pair of vertical stabilizers are mounted on the rear end of the fuselage and each includes a rudder and a pair of landing gear.

2 Claims, 5 Drawing Sheets

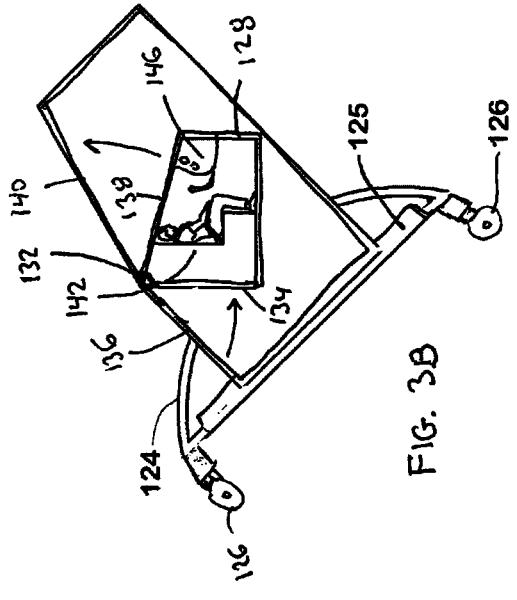
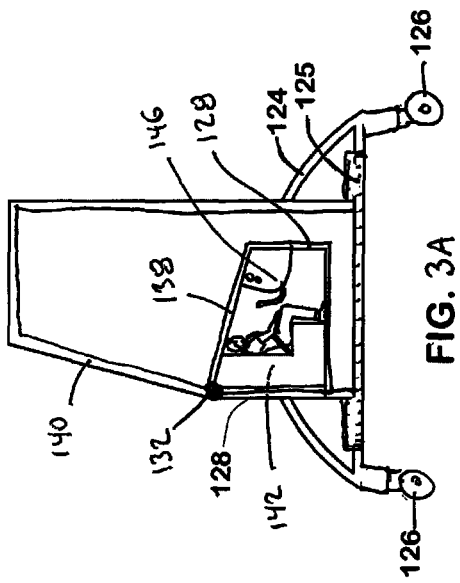
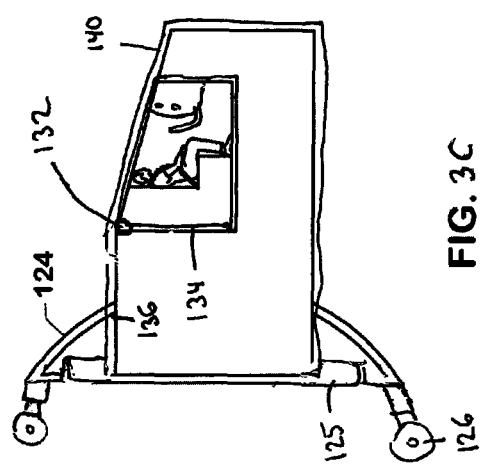

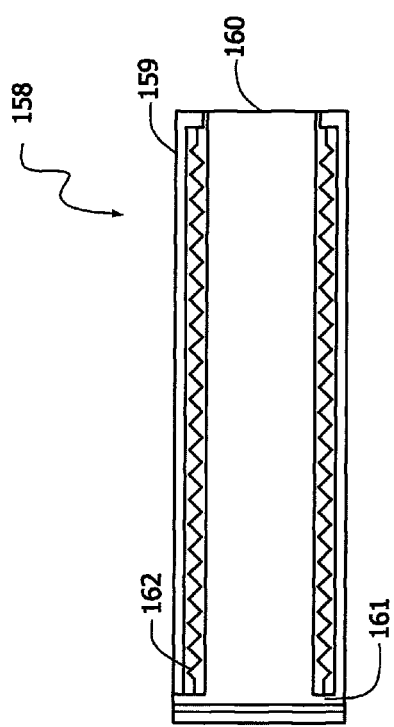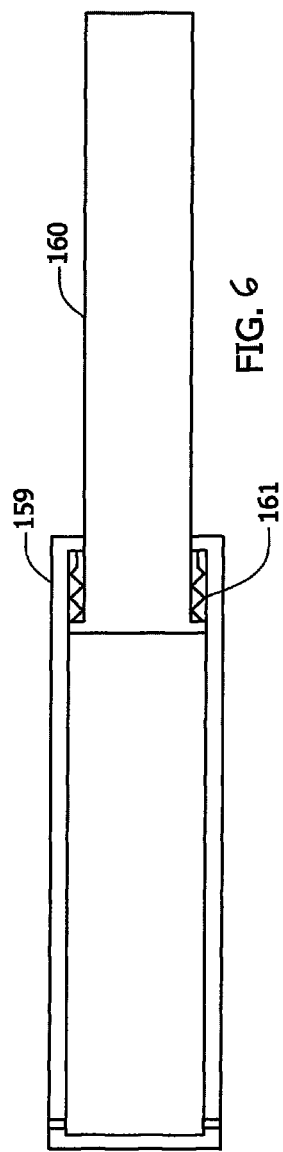

VERTICAL TAKEOFF AND LANDING AIRCRAFT

CROSS-REFERENCE TO RELATED APPLICATIONS

This application for a utility patent claims the benefit of U.S. Provisional Application No. 61/395,255, filed May 11, 2010.

STATEMENT REGARDING FEDERALLY SPONSORED RESEARCH

Not Applicable

BACKGROUND OF THE INVENTION

1. Field of the Invention

This invention relates generally to aircraft, and more particularly to a vertical takeoff and landing (VTOL) aircraft.

2. Description of Related Art

The most similar prior art is described in U.S. Pat. No. 6,863,241. The prior art aircraft disclosed in this patent used a boom functioning as a "free lever" for thrust vectoring. The aircraft uses pivoting engines in a tractor position and the fuselage for thrust vectoring instead of a boom. The prior art aircraft requires a complex gearbox to direct a boom which maintains the fuselage in a near horizontal position. The prior art aircraft requires a much narrower center of gravity range than the aircraft. The prior art aircraft has considerable fuselage down wash forces from the thrust sources which are eliminated in the aircraft.

SUMMARY OF THE INVENTION

The present invention teaches certain benefits in construction and use which give rise to the objectives described below.

The present invention provides an aircraft, comprising a fuselage having a front end, a rear end, and a longitudinal axis; a lifting free wing pivotally connected to the fuselage with a pivot; a nose section pivotally mounted on the front end of the fuselage, the nose section having a pair of engines, and a pair of counter-rotating propellers each operably connected with one of the pair of engines, for generating thrust for propelling the aircraft; a canard free wing pivotally connected to the nose section with a pivot; and a pair of vertical stabilizers mounted on the rear end of the fuselage, each of the pair of vertical stabilizers having a rudder and a pair of landing gear, the landing gear of the pair of vertical stabilizers being positioned for supporting the fuselage in a launch position wherein the longitudinal axis is generally vertical.

A primary objective of the present invention is to provide an aircraft having advantages not taught by the prior art.

Another objective is to provide an aircraft that is capable of vertical takeoffs and landings.

Another objective is to provide an aircraft that is easier to land due to a pivoting cockpit A further objective is to provide an aircraft is more maneuverable than prior art aircraft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 3A-3C are side elevational views of a cockpit in the takeoff, illustrating the cockpit pivoting from a takeoff attitude, through a transition attitude, to a cruise attitude

FIG. 5 is a top plan sectional view of the variable diameter propeller in a collapsed configuration.

FIG. 6 is a top plan sectional view of the variable diameter propeller in an extended configuration.

DETAILED DESCRIPTION OF THE INVENTION

Definitions

As used herein, the term "center of drag" means that point in space at the intersection of the horizontal, vertical, and lateral axis of a drag.

As used herein, the term "ailevon" means a control surface used as an aileron when used asymmetrically and as an elevator when used symmetrically.

As used herein, the term "dynamic equilibrium" means a state which remains stable while undergoing constant change within a given operating envelope because any change in inputs within the operating envelope produces a transition toward, but not necessarily an achievement of, a new, but stable, equilibrium.

As used herein, the term "free wing" or "pivot wing" means a wing attached to an aircraft fuselage in a manner such that the wing is freely pivotal about its span wise axis. In other words, the free wing has an angle of attack which is determined solely by aerodynamic forces during flight.

As used herein, the term "lift/drag pendulum" or "drag pendulum" means the force vector resolution of the gravitational force acting on the aircraft interacting with the drag forces and the lift forces acting upon the aircraft.

As used herein, the term "static equilibrium" means a stable, fixed equilibrium state to which a system will return to after a disturbance is introduced and then removed.

Other terms are defined herein where initially discussed.

Figure 1:
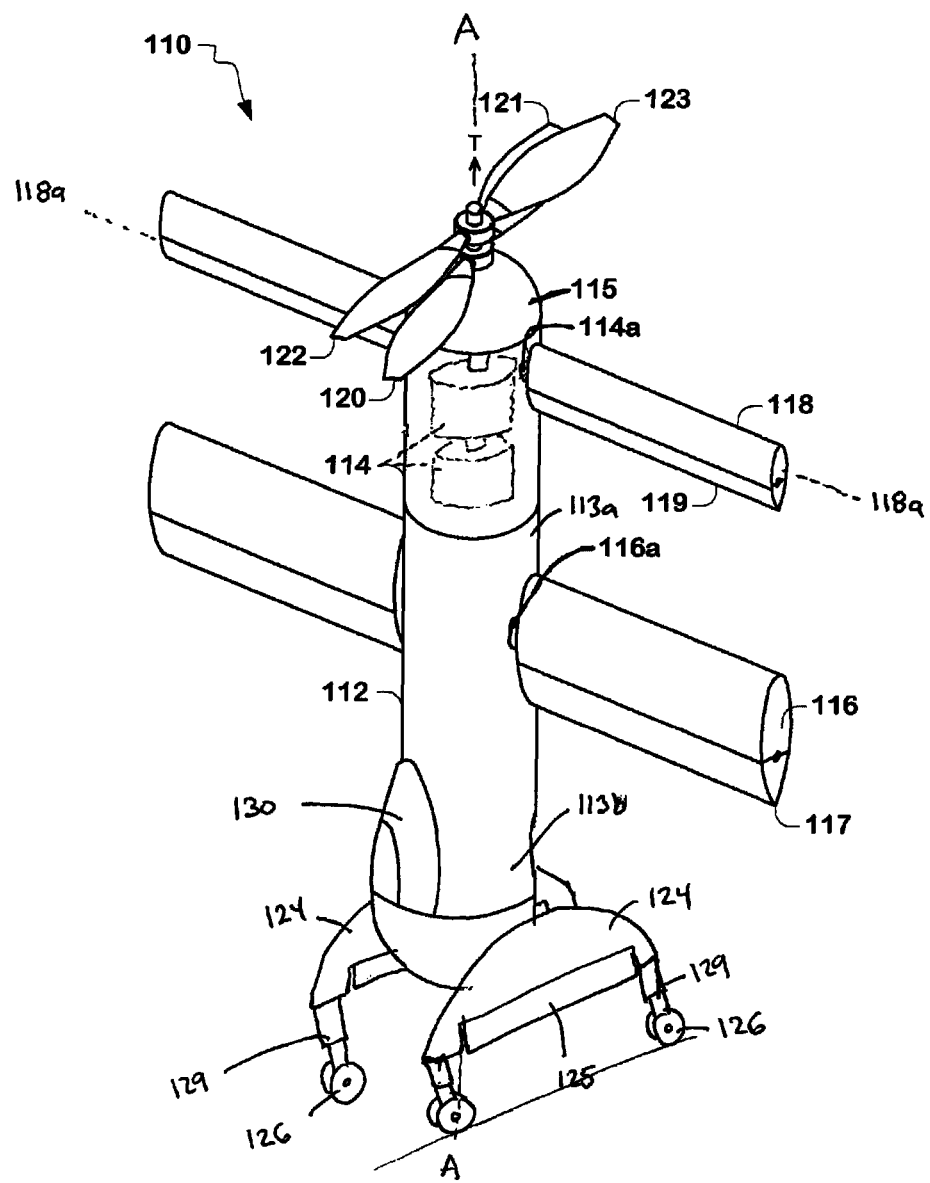
FIG. 1 is a perspective view of an aircraft in a takeoff and landing position.
Figure 2:
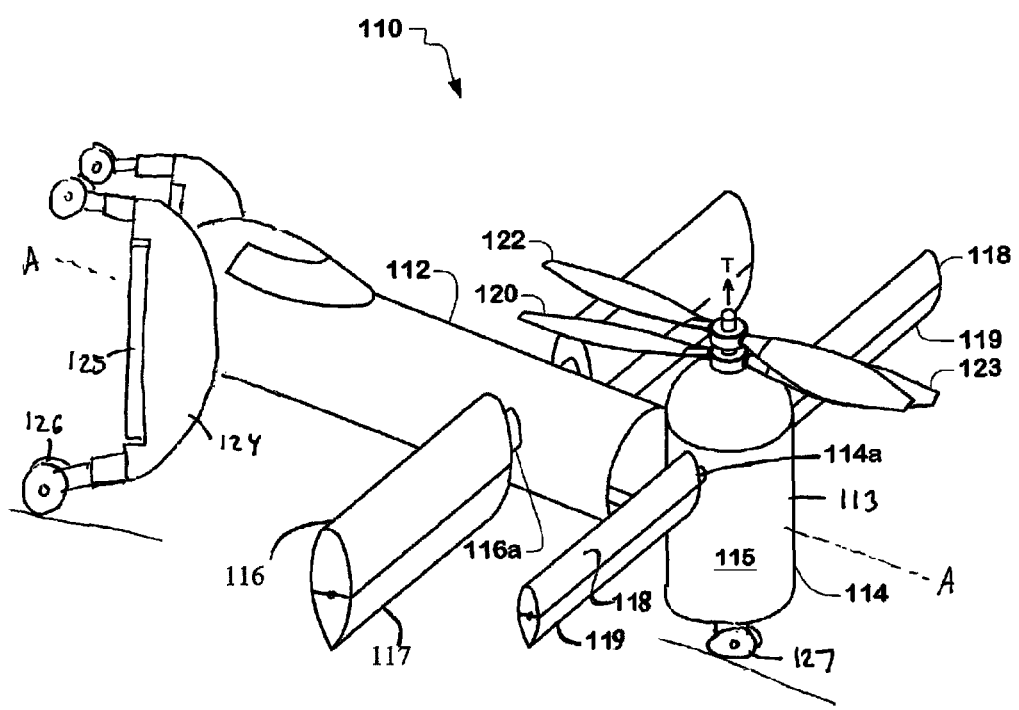
FIG. 2 is a perspective view of the aircraft in a parked position.

FIGS. 1-2 are perspective views of one embodiment of an aircraft 110 of present invention. FIG. 1 is a perspective view of the aircraft in a takeoff and landing position. FIG. 2 is a perspective view of the aircraft in a parked position. As illustrated in FIGS. 1 and 2, the aircraft 110 includes a fuselage 112 pivotally connected with a nose section 115 having an engine assembly 113 and an engine 114, in this embodiment a pair of engines 114. A single engine, or multiple engines, and/or a gear box (not illustrated) may all be utilized, as is known to one skilled in the art, and any such arrangement should be considered within the scope of the present invention.

The fuselage 112 includes a front end 113a, a rear end 113b, and a longitudinal axis A. The fuselage 112 is aerodynamically shaped for flight along the length of its axis A. Free wings 116 and 118 are pivotally attached to fuselage 112. The engines 114 are operably connected with counter-rotating propellers 120 and 122 of the propeller assembly to provide thrust to the aircraft 110. In this example of the invention, the propeller 120 and 122 is shown as a counter-rotating propeller having propeller blades 121, 123. The counter-rotating propellers 120 and 122 minimizes any bending moments and unbalanced torque from being applied to the fuselage of aircraft 110. The minimization of any unbalanced torque applied to the fuselage of the aircraft 110 eliminates the need for a tail rotor.

The engines 114 in the aircraft are mounted with the front propeller 122 driven by the rear engine and the rear propeller 120 driven by the forward engine. The engines are pivoted at 114a, a point above the center of gravity of the engines. Therefore gravity will maintain the engines in a vertical position until air pressure from forward motion of the aircraft, pitch forces from the canard or a mechanical device rotate the engines forward for thrust vectoring. The vertical stabilizer 124 and rudder 125 is used for yaw control in horizontal flight and roll control in vertical flight and as a main gear 126 for takeoff and landing.

In one embodiment, struts 129 operably connecting each of the pair of landing gear 126 with one of the pair of vertical stabilizers 124. The struts 129 function to absorb some of the impact when landing. The struts 129 are preferably angled away from the axis A of the fuselage, so that the landing gear 126 contact the ground when the aircraft 110 is in the parked position, illustrated in FIG. 2.

As mentioned above, wing 116, which is preferably a free wing, is pivotally secured to the fuselage 112 of the aircraft 110 via a pivot 116a, for free rotation about a span-wise axis 118a. A free wing, as is well known in the art (see, for example, U.S. Pat. Nos. 5,509,623, 5,769,359, 5,765,777, 5,560,568, 5,395,073, 5,340,057, and 5,280,863 which are incorporated by reference herein in their entireties), is a wing attached to an aircraft fuselage in a manner such that the wing is freely pivotal (i.e., without pilot intervention) about its span wise axis which is usually located forward of its aerodynamic center. This arrangement enables the wing to have an angle of attack which is determined solely by aerodynamic forces during flight and, therefore, subject only to aerodynamic pitching moments imposed by wing lift and drag. Rotation of the wing, without pilot intervention, induced by positive or negative vertical wind gusts striking the wing during flight, causes the angle of incidence or pitch between the wing and the aircraft fuselage to vary so that the wing presents a constant angle of attack to the relative wind enabling the aircraft to be essentially stall free during flight. The use of a mechanically adjustable pivoting free wing in the inventive aircraft has an advantage that the lift produced by the free wing can be maximized for takeoff and landing and then released to freely pivot for the other flight modes.

In other words, the weight of the aircraft is gradually "transferred" to the free wing. As a result, the aircraft can smoothly change its flight mode from horizontal or vertical flight to any transition flight mode or vice versa. In contrast, if, for example, a fixed wing is used, the fixed wing generally does not produce lift below the stall speed of the aircraft. When the forward speed of the aircraft reaches the stall speed, the weight of the aircraft is "suddenly" transferred to the wing, causing a shock which may be unpleasant to the crew or passengers of the aircraft.

Preferably, the free wing 116 includes plural ailevons 117 for lateral control in horizontal flight of aircraft 110. The angle of attack of the free wing 116 may be adjusted and the lateral control provided during horizontal flight through the use of plural ailevons.

The aircraft 110 may include any number of means of controlling yaw stability in horizontal flight including wing tip vertical stabilizers and rudders, tail mounted vertical stabilizers and rudders, or clam-shell ailerons. The aircraft 110 may include any number of means of controlling yaw stability in vertical flight including ventral rudders within the propeller wash, or differential propeller torque. In the illustrated embodiment, the aircraft 110 includes nose section 115 pivotally secured to the fuselage 112 at 114a, having canard free wing 118 and ailevon 119 used for pitch control of the aircraft.

FIG. 2 shows the aircraft 110 in the parked position. The engines pivot about point 114a and the thrust is increased to rotate the fuselage 112 to the optimum takeoff and landing position FIG. 1. After landing the procedure is reversed to allow the fuselage to rotate to the parked horizontal position using the parking wheels 126 and 127 for ground movement. Another version of the aircraft can have a nose gear attached at 114a to support the aircraft on the nose gear wheels 127 and main gear wheels 126 if the engines 114 are not pivoted.

The thrust (T) of the propellers 120 and 122. FIG. 1-2 provides a lift and/or forward thrust for the aircraft 110. The lift and/or forward thrust provided by propeller 120 and 122 can vary depending on the forward tilt angle fuselage and engines, as will be best understood in the following description with reference to FIGS. 1-2. The pivotable free wing 116 and canard free wing 118 provide a lift and drag for the aircraft 110. The lift and drag provided by free wing 116 and canard free wing 118 can vary depending on the airflow about the free wing and, hence, on the forward thrust provided by propeller 120 and 122. The free wing 116 and canard free wing 118 supplies the necessary vertical lift to the aircraft 110 lost by the angular orientation of the propeller 120 and 122.

FIG. 1 shows all of the thrust of the propeller 120 and 122 is directed in an upward pitch of between 45 degrees and 90 degrees from the horizon for takeoff and landing depending on wind conditions and the lift provided by the pivot wings. The free wing 116 and canard free wing 118 provides maximum lift for the aircraft 110 under this mode of operation. The canard free wing 118 using plural ailevons 119 to control pitch in addition to the pivot engines of the aircraft. The canard free wing is free to pivot about the span wise axis 118a. The canard free wing provides all of the lift for the engines and propeller drive system at the nose section 115 of the aircraft in horizontal flight. The plural ailerons 117 on the free wing 116 control roll. The rudders 124 and 125 control yaw.

FIG. 1 rotated clockwise shows horizontal flight, the vertical component of the thrust (T) for lifting the aircraft 110 is zero. The horizontal component of the thrust (T) for moving the aircraft 110 in the forward direction is (T). The upward lift of the free wing 116 combined with the canard free wing 118 provides the total required lifting capacity for lifting the aircraft 110. The aircraft airspeed is such that the drag about the aircraft 110 is equal to the thrust (T).

FIGS. 3A-3C illustrate a cockpit 130 of FIG. 1 in greater detail. FIG. 3A illustrates a passenger compartment 128 of the cockpit 130 in a launch position, wherein the passenger compartment 128 is pivoted about a pivot 132 to maintain desired alignment with the horizon. In this embodiment, a rear sidewall 134 of the passenger compartment 128 abuts a lower bulkhead 136 of the fuselage 112. The compartments are constructed to allow the pilots and passengers a clear view of the horizon during takeoff, landing and parking. Another version has pivoting seats within the compartments instead of pivoting the entire compartment.

The passenger compartment 128 includes a seat 142 having restraints 144 for accommodating a pilot (or, more typically, multiple such seats for additional crew and passengers). Controls 146 (i.e., stick, throttle, instruments, radios, etc.) are installed in the passenger compartment 128 so as to be operably positioned for use by the pilot.

FIG. 3B illustrates the passenger compartment 128 pivoting from the launch position towards a cruise position while the aircraft 110 is transitioning from takeoff to cruise.

FIG. 3C illustrates the passenger compartment 128 once it has pivoted completely to the cruise position. In the present embodiment, the passenger compartment 128 forward sidewall 138 of the passenger compartment 128 abuts an upper bulkhead 140 of the fuselage 112.

The aircraft of the present invention solves a number of problems involved with the fundamental functional usage of aircraft, and has the following advantages over the prior art. First, the inventive aircraft is stable in all flight modes, whether in horizontal, vertical or any transition flight modes. Second, flight safety in the inventive aircraft is enhanced because the wing in the aircraft of the present invention does not stall. Third, the operational efficiency of the aircraft of the present invention is increased during takeoff and landing by mechanically adjusting the pivot wings for maximum lift, which requires as much as forty percent less thrust as the prior art aircraft that have no lift generated by the wings in the takeoff and landing phase. During cruise flight the wing is sized much smaller to produce less drag. Fourth, the variable diameter propeller 158 described below in FIG. 4-6, will maximize the performance of the aircraft. Fifth, the passenger, cargo, and cockpit compartments or seats pivot to allow continuous level alignment with the horizon. Sixth, the aircraft minimizes down wash forces on the fuselage during takeoff and landing therefore requiring less power for takeoff and landing.

Seventh, the 80 to 45 degree pitch attitude for takeoff and landing deflects the propwash at an angle with the takeoff and landing surface to minimize the propwash ground effects that cause maximum control problems for prior art vertical takeoff and landing aircraft. Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. For example, although the embodiment in the foregoing description uses a propeller as means for generating thrust, it is within the scope of the present invention to provide the aircraft with alternative means for generating thrust, e.g., a jet engine or jet engines mounted at pivot point 114a with the engines rotated mechanically at the pivot point 114a. The wings can also be pivoted aft at the pivot points 116a, and 118a for parking.

In FIG. 2 the aircraft is in the parked position.

Figure 4:
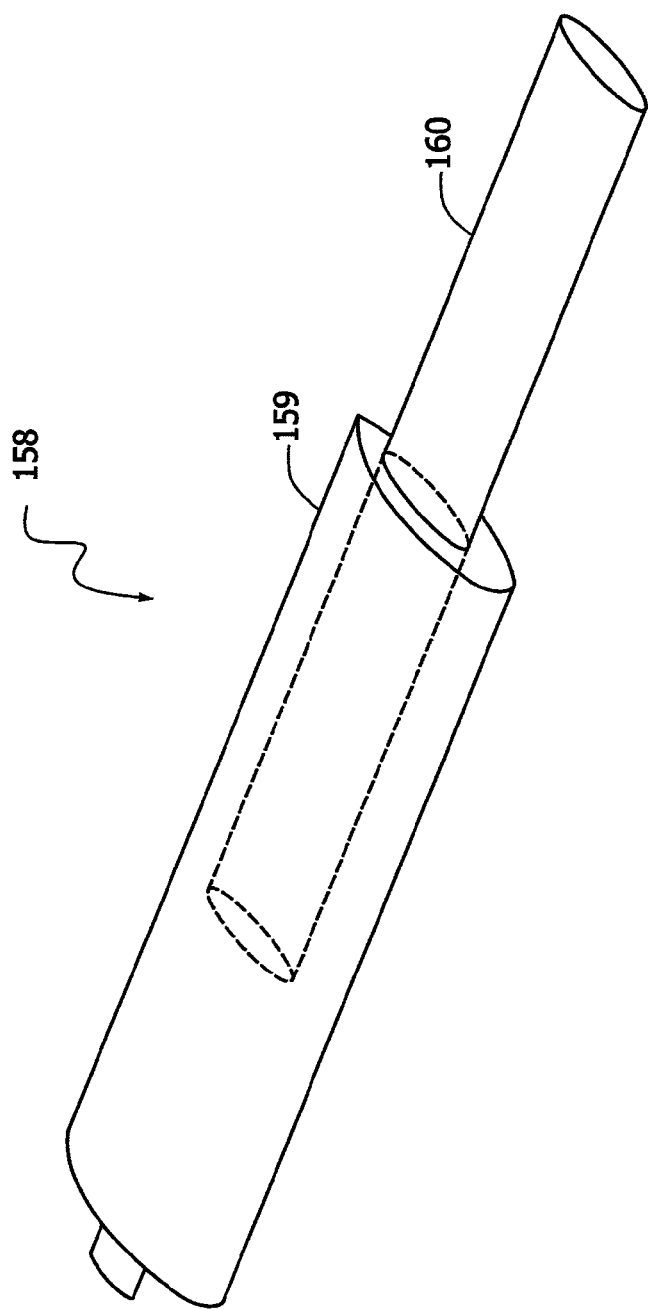
FIG. 4 is a perspective view of a variable diameter propeller.

For another example the propellers 120 and 122 could be replaced with an improved variable diameter version 158 described in FIG. 4-6. The variable diameter propellers allow the use of much less powerful engines and higher cruise speed of the aircraft. Centrifugal force at takeoff power will compress the springs 162 in the inboard section of the propeller 159 to allow the outboard section 160 to extend to a larger diameter for increased lift with less engine power for vertical takeoff and landing. In horizontal flight the propeller rpm is reduced to allow the plural springs 162 to retract the outboard blade 160 into the inboard blade 159 and locked in the retracted position by plural locking pins 161. In the locked refracted position propeller rpm can be changed to any desired rpm without extension of the outboard blade. The inboard blade 159 is optimized for cruise flight while the extended diameter blades are optimized for vertical takeoff and landing.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. An aircraft, comprising:
   a fuselage having a front end, a rear end, and a longitudinal axis;
   a lifting free wing pivotally connected to the fuselage with a lifting wing pivot that allows rotation around a lifting wing span wise axis;
   a nose section pivotally mounted on the front end of the fuselage, the nose section having a pair of engines, and a pair of counter-rotating propellers each operably connected with one of the pair of engines, for generating thrust along a thrust axis for propelling the aircraft, the nose section pivoting about a nose section span wise axis;
   a canard free wing pivotally connected to the nose section with a canard wing pivot to allow rotation around a canard span wise axis;
   wherein the lifting free wing span wise axis is rearward of the nose section span wise axis;
   a pair of vertical stabilizers mounted on the rear end of the fuselage, each of the pair of vertical stabilizers having a rudder and a pair of landing gear, the landing gear of the pair of vertical stabilizers being positioned for supporting the fuselage in a takeoff and landing position wherein the longitudinal axis is generally vertical;
   a cockpit formed in the fuselage; and
   wherein in the takeoff and landing position in which the longitudinal axis of the fuselage is vertical and the aircraft rests upon the landing gear of the vertical stabilizers, the nose section is positioned such that the pair of counter-rotating propellers generate thrust directed along the longitudinal axis of the fuselage, and the pair of vertical stabilizers are positioned within the thrust so that the rudders are operably positioned to provide control of the aircraft during takeoff and landing, and
   wherein the aircraft may also be reconfigured to a parked position wherein the nose section is pivoted so that the longitudinal axis of the fuselage is generally horizontal, the thrust axis is generally perpendicular to the longitudinal axis of the fuselage, and wherein a nose wheel gear operably mounted on the nose section to support the aircraft, along with two of the landing gear mounted on the vertical stabilizers, the two of the landing gear mounted on the vertical stabilizers being mounted on struts that are angled away from the longitudinal axis of the fuselage so that the landing gear may operatively contact the ground in either the takeoff and landing position, and also in the parked position.

2. The aircraft of claim 1, further comprising:
   a passenger compartment pivotally mounted to the fuselage within the cockpit with a compartment pivot, the passenger compartment having a forward sidewall and a rear sidewall for containing a seat and restraints for holding a pilot of the aircraft, as well as controls for controlling the operation of the aircraft,
   the passenger compartment pivoting between a launch position and a cruise position so that the pilot remains horizontal despite movement of the aircraft between the takeoff, cruise, and parked positions, and wherein both the seat containing the pilot and the controls utilized by the pilot all swing together on the compartment pivot between the launch position and the cruise position.

\* \* \* \* \*